(12) United States Patent
Prouvost

(10) Patent No.: US 6,765,325 B1
(45) Date of Patent: Jul. 20, 2004

(54) ALTERNATING CURRENT ELECTRIC MOTOR

(75) Inventor: Hubert Prouvost, Pau (FR)

(73) Assignee: Elf Exploration Production, Courbevoie (FR)

( * ) Notice: Subject to any disclaimer, the term of this patent is extended or adjusted under 35 U.S.C. 154(b) by 0 days.

(21) Appl. No.: 10/069,887

(22) PCT Filed: Aug. 31, 2000

(86) PCT No.: PCT/FR00/02410

§ 371 (c)(1),
(2), (4) Date: Jun. 24, 2002

(87) PCT Pub. No.: WO01/18942

PCT Pub. Date: Mar. 15, 2001

(30) Foreign Application Priority Data

Sep. 3, 1999 (FR) .............................. 99 11076

(51) Int. Cl.[7] .............................. H02K 5/12; H02K 5/00
(52) U.S. Cl. .............................. 310/87; 310/85; 310/86; 310/88; 310/89; 310/254; 417/410.1; 417/413.1
(58) Field of Search .............................. 310/254, 87, 85, 310/86, 89; 417/410.1, 413.1

(56) References Cited

U.S. PATENT DOCUMENTS

| 4,030,058 A | 6/1977 | Riffe et al. | ................. 336/92 |
|---|---|---|---|
| 4,684,840 A | * 8/1987 | Bertram et al. | ............. 310/162 |
| 5,134,328 A | * 7/1992 | Johnatakis et al. | ........... 310/54 |
| 5,767,606 A | * 6/1998 | Bresolin | ..................... 310/254 |

FOREIGN PATENT DOCUMENTS

| EP | 0 604 762 A | 7/1994 | .......... H02K/21/18 |
|---|---|---|---|
| FR | 916 681 A | 1/1947 | |
| FR | 973 151 A | 2/1951 | |

* cited by examiner

Primary Examiner—Karl Tamai
Assistant Examiner—Yahveh Comas
(74) Attorney, Agent, or Firm—Birch, Stewart, Kolasch & Birch, LLP

(57) ABSTRACT

The invention concerns an AC electric motor (1) comprising a stator magnetic circuit including a first part (2) whereon are mounted electrical windings (7 and 8) and a second recessed part (10) wherein is mounted a rotor (14). The invention is characterized in that the first part (2) of the stator magnetic circuit and the electrical windings (7 and 8) are mounted inside a stator chamber (20) with sealed wall, the second part (10) of the stator magnetic circuit, the cylindrical rotor (14) being located outside said chamber. The invention is applicable in the oil industry for pumping fluids in bottom holes producing hydrocarbons in liquid, gas or polyphase form and in chemical and nuclear industries for pumping dangerous or chemically harmful fluids.

14 Claims, 4 Drawing Sheets

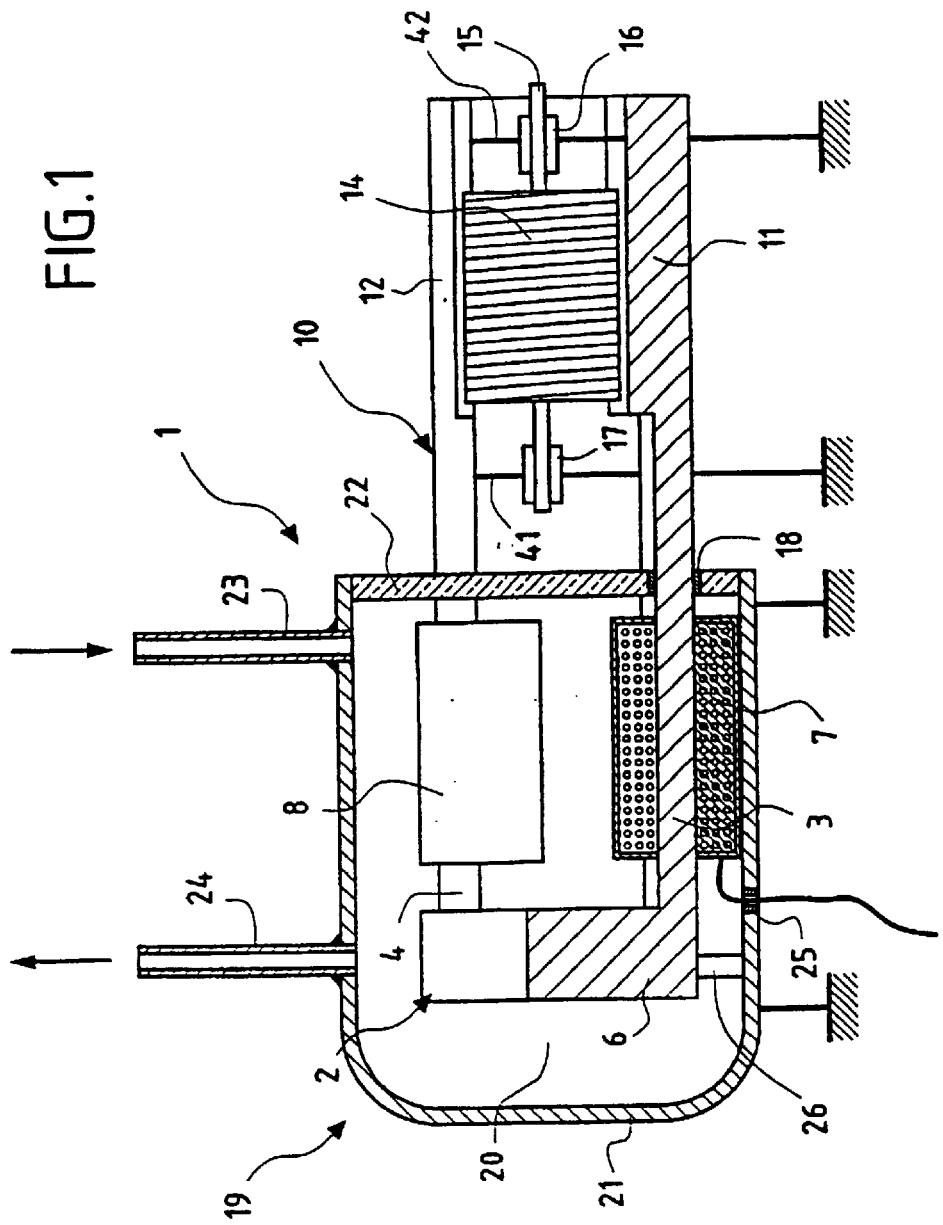
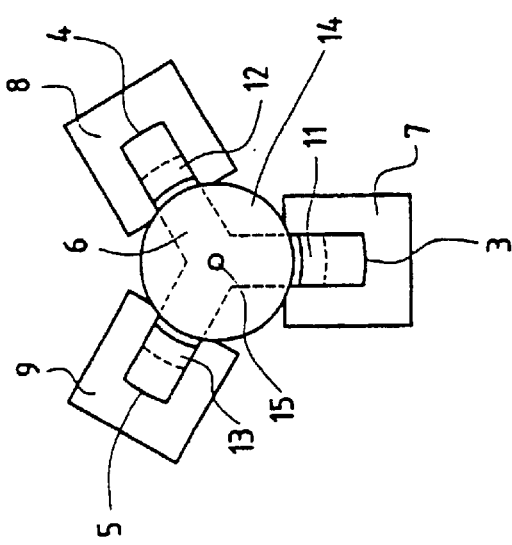

ALTERNATING CURRENT ELECTRIC MOTOR

This application is the national phase under 35 U.S.C. § 371 of PCT International Application No. PCT/FR00/02410 which has an International filing date of Aug. 31, 2000, which designated the United States of America.

The present invention relates to an alternating-current motor intended to drive a pump or a compressor.

It is particularly suitable for the production of pumping units which are immersed in a liquid.

It finds its application especially in the oil industry for pumping fluids at the bottom of production wells for hydrocarbons in liquid, gaseous or multi-phase form.

BACKGROUND OF THE INVENTION

The electric motors which are most widely used are single-phase or multi-phase asynchronous alternating-current motors. Their structure is described in TECHNIQUES DE L'INGENIEUR (ENGINEERING TECHNOLOGY), a treatise on electrical engineering, Volume D 3 II Chapter D 3 490 Asynchronous motors—choice and related problems.

According to this document, asynchronous alternating-current motors essentially include a stator and a rotor.

The stator consists of coiled windings of conducting wires distributed within a yoke ring forming a framework and housed within a magnetic circuit supported by this yoke ring. This magnetic circuit is formed by stacks of laminations in the form of circular crowns into which slots are cut parallel to the axis of the yoke ring and in which the conducting wires of the coiled windings are housed.

Within the crown-shaped magnetic circuit formed by the stack of laminations is placed the cylindrical-shaped rotor which includes a rotational shaft supported by a support bearing which is integral with the yoke ring of the stator.

The most widespread type of rotor is the squirrel cage rotor, the circuit of which consists of conducting bars regularly spaced between two metal crown rings forming the extremities.

This squirrel cage is inserted within a magnetic circuit consisting of disks stacked on the rotational shaft.

With this type of motor, since the distances between the windings of the stator are very short, they cannot be supplied with very high voltages and the installation of insulators is an intricate matter.

The same problem is posed for the insulation of the windings with respect to the laminations of the stator circuit.

For certain applications, for example for raising water from a water table or hydrocarbons laid down at the bottom of a well, the shaft of the motor is coupled to a pump and the motor-plus-pump assembly is immersed in the fluid to be pumped.

In this case, the space between the rotor and the stator is filled with liquid, which further accentuates the problems of electrical insulation set out above.

One known solution consists in separating the motor from the pump, but requires the use of a dynamic sealing device mounted on the shaft of the motor. Such sealing devices are delicate and unreliable. They are poorly adapted to the long-term service required for those installations to which access is difficult, expensive or even dangerous.

SUMMARY OF THE INVENTION

The precise object of the present invention is to remedy these drawbacks, and especially to provide an alternating-current electric motor the windings of which can withstand a high voltage and which are easy to produce by virtue of the large distances which separate the windings from each other and the windings from the stator magnetic circuit.

This electric motor is particularly suitable for forming a submerged electric-pump unit.

To this end, the present invention proposes an alternating-current electric motor including a stator magnetic circuit comprising a first part on which electrical windings are mounted and a second, hollow, part within which is mounted a cylindrical rotor equipped with a rotational shaft supported by at least two bearings, which motor is characterized in that it further includes a stator chamber with a leaktight wall, at least a part of which is produced from a non-magnetic insulating material, within which are mounted the first part of the stator magnetic circuit and the electrical windings, the second part of the stator magnetic circuit, the cylindrical rotor and the support bearings lying outside the said chamber and being arranged in such a way that the stator magnetic circuit passes through the wall of the said chamber in the part produced from non-magnetic insulating material.

According to another characteristic of the motor of the invention, with the shaft of the rotor of the said motor being linked mechanically to the shaft of the rotor of a pump, the second part of the stator magnetic circuit, the rotor of the said motor, the support bearings and the rotor of the pump are enclosed in a rotor chamber with a leaktight wall equipped with an inlet and with an outlet for a fluid to be pumped.

According to another characteristic of the motor of the invention, the leaktight wall of the stator chamber includes a device for compensating for the pressure difference between the inside and the outside of the said chamber.

According to another characteristic of the motor of the invention, the stator electrical windings include at least one connection for drawing electrical energy.

According to another characteristic of the motor of the invention, the stator magnetic circuit includes a supplementary electrical winding for drawing electrical energy.

According to another characteristic, the motor of the invention further includes an inlet tapping and an outlet tapping which are mounted on the wall of the stator chamber for connecting an external device for cooling a fluid filling the stator chamber.

According to a final characteristic, the motor of the invention further includes a jacket produced from a non-magnetic insulating material which encases the first part of the stator magnetic circuit, connected in leaktight fashion to the part produced from non-magnetic insulating material of the wall of the chamber in order to render the said chamber leaktight.

BRIEF DESCRIPTION OF THE DRAWINGS

Other characteristics and advantages of the invention will become apparent on reading the description which follows, given by way of example and by reference to the attached drawings, in which:

FIG. 1 is a view in longitudinal section of an electric motor according to a first embodiment of the invention, FIG. 2 is a side view of a part of an electric motor according to the first embodiment of the invention.

DETAILED DESCRIPTION OF THE INVENTION

Figure 3:
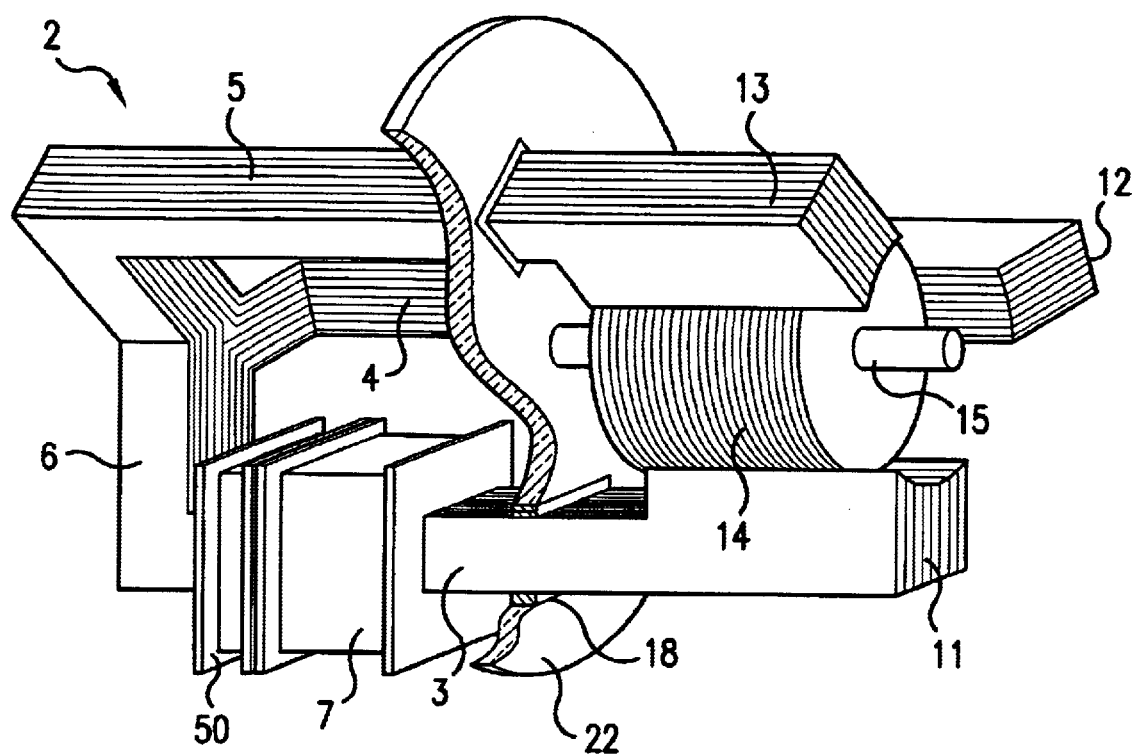
FIG. 3 is a perspective view of a part of an electric motor according to the first embodiment of the invention.

FIG. 1 represents a view in longitudinal section of a first embodiment of the motor 1 of the invention which includes a laminated stator magnetic circuit which comprises:

- a first part 2 consisting of three core segments 3, 4 and 5, of which only the segments 3 and 4 are visible in FIG. 1, spaced in this instance by 120° and forming a yoke 6 at one of their ends.
- a second part 10, consisting of three core segments 11, 12 and 13 which extend the three segments 3, 4 and 5, of which only 11 and 12 are visible in FIG. 1 and the ends of which form a cylindrical. hollow.

On each of the core segments 3, 4 and 5 are mounted electrical windings 7, 8 and 9 of which only 7 and 8 are visible in FIG. 1.

The three segments 3, 4 and 5 of the stator magnetic circuit and the electrical windings which they support are placed in a fixed cylindrical casing 19, closed in leaktight fashion at one end by a back plate 21 and, at the opposite end, by a closure plate 22.

This plate 22 is produced from an insulating and non-magnetic material so as not to constitute a short-circuit turn around the stator magnetic circuit, nor a magnetic shunt of the same circuit.

The casing 19 and the plate 22 form a leaktight stator chamber 20. The casing 19 includes a leaktight cable bush for a stator-winding power-supply cable to pass through. The plate 22 includes leaktight bushes 18 for the passage respectively of the three cores of the stator magnetic circuit consisting of the segments 3, 4, 5, 11, 12 and 13.

The laminations which constitute the cores of the stator circuit are assembled in leaktight fashion in the region of their passage through the plate 22, for example by means of a thin layer of flexible insulating material arranged between two adjacent laminations.

The yoke 6 of the stator magnetic circuit 2 is held by the support 26.

The casing 19 is also equipped with an inlet tapping 23 and with an outlet tapping 24 for connecting an external device for cooling an insulating fluid filling the stator chamber 20, not represented in FIG. 1.

In the hollow situated at the end of the second part 10 of the stator magnetic circuit 2 is mounted a laminated rotor 14 which includes a rotational shaft 15 which rests on the fixed bearings 16 and 17 linked mechanically by fixing pieces 41 and 42 to the second part 10 of the stator circuit so as to ensure centering of the rotor and of the stator. The fixing pieces 41 and 42 are produced from insulating and non-magnetic material so as not to form a short-circuit turn around the segments of stator cores and not to magnetically short-circuit the stator magnetic circuit.

FIG. 2 represents a partial side view of the motor, which shows the relative positions of the stator magnetic circuit comprising the core segments 3, 4, 5 which are linked by the yoke 6, the core segments 11, 12 and 13, the windings 7, 8, 9 mounted on the core segments 3, 4, 5 and the rotor 14 with its shaft 15.

FIG. 3 represents a partial view in perspective of the motor, on which appear the stator magnetic circuit 2 comprising the core segments 3, 4, 5 linked by the yoke 6, the core segments 11, 12 and 13, the rotor 14 with its shaft 15, the electrical winding 7 mounted on the core segment 3 and the plate 22 equipped with a leaktight bush 18 for the passage of the segment 11.

FIG. 3 further includes a supplementary electrical winding 50 mounted on core segment 3 next to electrical winding 7. As is known to those skilled in the art, such a supplementary electrical winding forms an electrical transformer together with the stator magnetic circuit and electrical winding 7. The supplementary winding acts as a secondary winding of the transformer and accordingly is capable of delivering an electrical voltage when winding 7 is supplied with an alternating electrical voltage.

Figure 4:
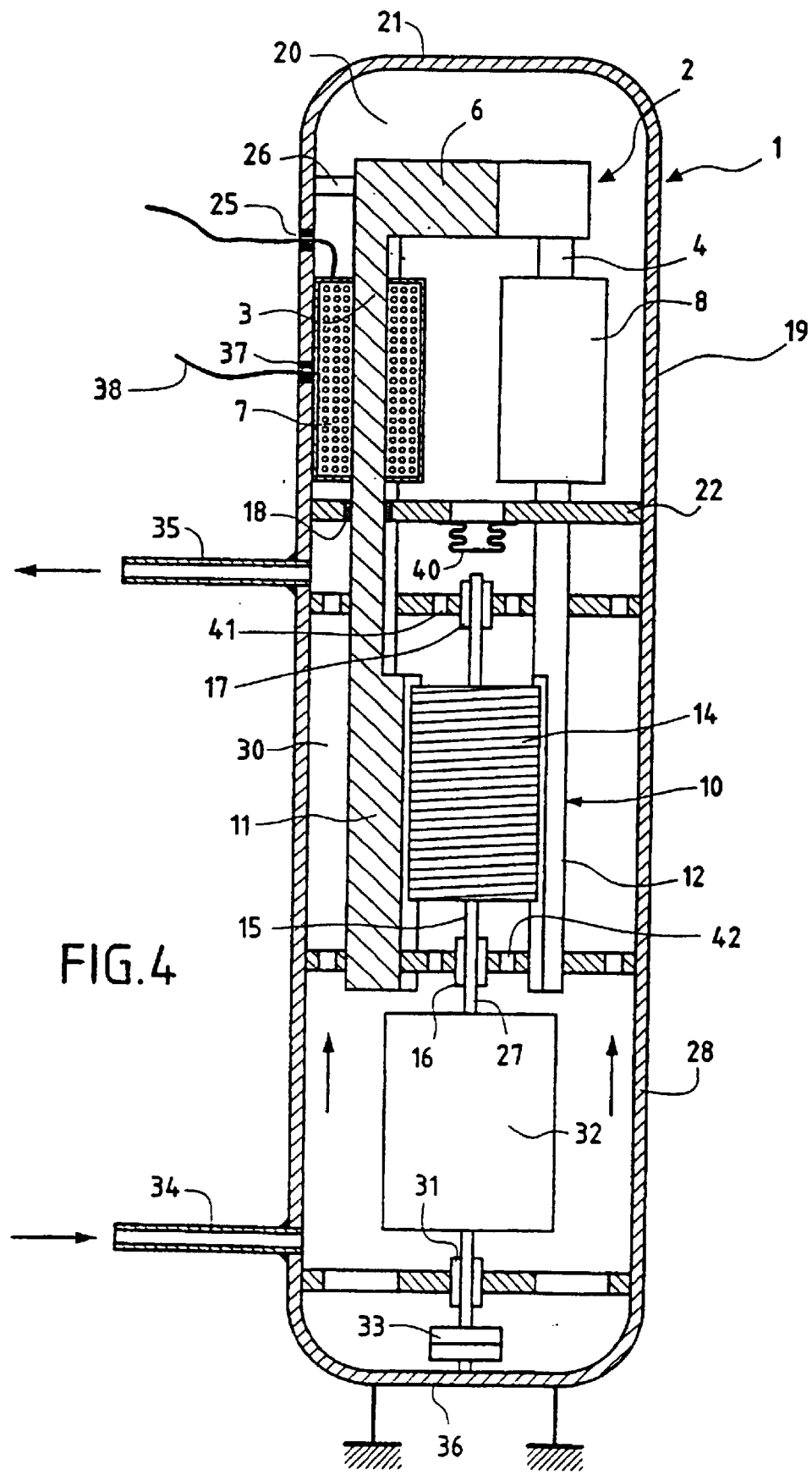
FIG. 4 is a view in longitudinal section of an electric motor according to a second embodiment of the invention.

According to a second embodiment represented diagrammatically in longitudinal section in FIG. 4, the motor 1 of the invention has its axis vertical and includes a stator magnetic circuit 2, electrical windings 7, 8, a casing 19, a plate 22 and a rotor 14 as described for the first embodiment and arranged in the same way.

According to this second embodiment, the motor 1 further includes:

- a pump impeller 32 equipped with a shaft 27 linked to the end of the shaft 15 of the rotor 14 and equipped at its lower end with an axial abutment 33,
- a bellows 40 for compensating for the pressure difference between the two faces of the plate 22,
- an extension 28 of the casing 19 fitted with an end plate 36, which forms a rotor chamber 30 which encloses the second part 10 of the stator magnetic circuit, the rotor 14 and the impeller 32 of the pump,
- an electrical connection 38 for drawing electrical energy which passes through the casing 21 via a leaktight cable bush 37.

The shafts 15 and 27 are supported by bearings 16, 17 and 31, the bearings 16 and 17 being linked mechanically to the stator magnetic circuit by means of fixing pieces 41 and 42 as in the first embodiment, the bearing 31 and the abutment 33 being integral with the extension 28 of the casing 19.

The extension 28 of the casing 19 includes an inlet 34 and an outlet 35 for the liquid put into circulation by the impeller 32 driven by the rotor 14 of the motor.

In order to make the motor operate according to this second embodiment, immersed at the very great depth in a liquid, that is to say under very high static pressure, the stator chamber 20 is filled with a liquid.

By virtue of the bellows 40, the pressures between the stator chamber 20 and the rotor chamber 30 balance out, and thus the problems relating to the pressure difference between these two chambers disappear.

Figure 5:
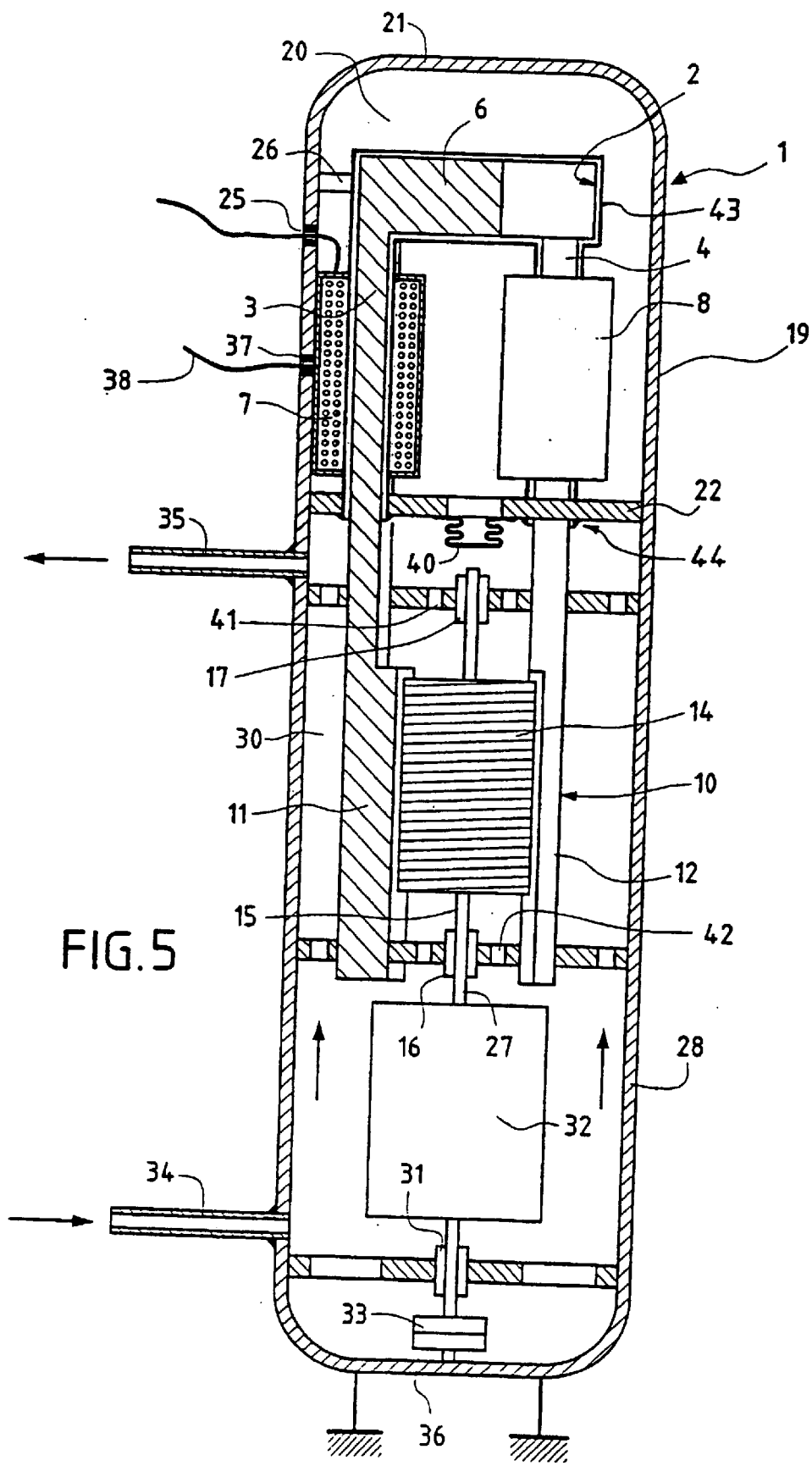
FIG. 5 is a view in longitudinal section of an electric motor according to a third embodiment of the invention.

According to a third embodiment represented diagrammatically in longitudinal section in FIG. 5, the motor 1 of the invention has its axis vertical and includes a stator magnetic circuit 2, electrical windings 7, 8, a casing 19, a plate 22 and a rotor 14 as described for the first embodiment and arranged in the same way.

According to this third embodiment, the leaktight bushes referenced 18 in FIG. 1 are replaced by a jacket referenced 43 in FIG. 5.

This jacket 43, produced from an insulating and non-magnetic material, encases the first part 2 of the stator magnetic circuit and is connected in leaktight fashion by a weld 44 to the part 22 of the wall of the stator chamber 20.

By virtue of this jacket, the leaktightness of the stator chamber 20 is ensured and the stator magnetic circuit is under the pressure conditions of the rotor chamber 13, which eliminates the problem of leaktightness of the passage through the part 22 of the wall of the rotor chamber 30 by the laminations of the stator magnetic circuit, and especially leaktightness between the laminations which may be difficult to achieve.

By virtue of the shape of the stator windings and of their mounting on the magnetic core segments, their electrical insulation is not limited by the size of the slots as in conventional motors, and, that being so, they can be supplied with voltages substantially higher than those of conventional motors, which avoids the use of a transformer in proximity to the motor when the latter is very far from its electrical power-supply source.

The electric motor of the invention also exhibits the advantage of including only static sealing devices which do not present the drawbacks of dynamic sealing devices, which confers on it great reliability, indispensable for numerous applications in which the motor is difficult of access, for example at the bottom of an offshore oil production well or in a dangerous area, as is the case in the nuclear industry and certain chemical industries where hazardous products are manufactured.

The electrical windings mounted in the leaktight chamber 20 are completely isolated from the surrounding medium and pumped fluid, which renders them insensitive to mechanical and chemical attack relating to the nature of the pumped fluids and of the surrounding medium.

The motor of the invention is particularly suitable for pumping hydrocarbons in multi-phase form at the bottom of offshore production wells at very great depth.

What is claimed is:

1. An alternating-current electric motor including a stator magnetic circuit, which comprises a first part (2) on which electrical windings (7, 8) are mounted and a second, hollow, part (10), a cylindrical rotor (14) equipped with a rotational shaft (15) supported by at least two bearings (16 and 17), the said rotor being arranged inside the hollow part of the stator circuit, and a stator chamber (20) with a leaktight wall, at least a part of which is produced from an insulating material, within which are mounted the first part (2) of the stator circuit and the electrical windings (7, 8), and outside which lie the cylindrical rotor (14), its rotational shaft (I 5) and the support bearings (16 and 17), which motor is characterized in that the second part (10) of the stator circuit lies outside the stator chamber (20) and in that this second part (10) of the stator circuit, the cylindrical rotor (14) with its rotational shaft (15) and the support bearings (16 and 17) are arranged in such a way, outside the stator chamber (20), that the stator magnetic circuit passes in a leaktight manner through the leaktight wall of the said chamber in the part of this wall produced from insulating material, which material is a non-magnetic insulant.

2. The motor as claimed in claim 1, characterized in that, with the shaft (15) of the rotor (14) of the said motor being linked mechanically to the shaft (27) of the rotor (32) of a pump, the second part (10) of the stator magnetic circuit, the rotor (14) of the said motor, the support bearings (16 and 17) and the rotor (32) of the pump are enclosed in a rotor chamber (30) with a leaktight wall equipped with an inlet (34) and with an outlet (35) for a fluid to be pumped.

3. An alternating-current electric motor including a stator magnetic circuit, which comprises a first part (2) on which electrical windings (7, 8) are mounted and a second, hollow, part (10), a cylindrical rotor (14) equipped with a rotational shaft (15) supported by at least two bearings (16 and 17), the said rotor being arranged inside the hollow part of the stator circuit, and a stator chamber (20) with a leaktight wall, at least a part of which is produced from an insulating material, within which are mounted the first part (2) of the stator circuit and the electrical windings (7, 8), and outside which lie the cylindrical rotor (14), its rotational shaft (15) and the support bearings (16 and 17), which motor is characterized in that the second part (10) of the stator circuit lies outside the stator chamber (20) and in that this second part (10) of the stator circuit, the cylindrical rotor (14) with its rotational shaft (15) and the support bearings (16 and 17) are arranged in such a way, outside the stator chamber (20), that the stator magnetic circuit passes through the wall of the said chamber in the part of this wall produced from insulating material, which material is a non-magnetic insulant wherein the leaktight wall of the stator chamber (20) includes a device (40) for compensating for the pressure difference between the inside and the outside of the said chamber.

4. The motor as claimed in claim 1, characterized in that the stator electrical windings (7,8) include at least one connection (38) for drawing electrical energy.

5. The motor as claimed in claim 1, characterized in that the stator magnetic circuit includes a supplementary electrical winding for drawing electrical energy.

6. The motor as claimed in claim 1, characterized in that it further includes an inlet tapping (23) and an outlet tapping (24) which are mounted on the wall of the stator chamber (20) for connecting an external device for cooling a fluid filling the stator chamber (20).

7. The motor as claimed in claim 1, characterized in that it further includes a jacket (43) produced from a non-magnetic insulating material which encases the first part (2) of the stator magnetic circuit, connected in leaktight fashion to the part (22) produced from non-magnetic insulating material of the wall of the chamber (20) in order to render the said chamber leaktight.

8. The motor as claimed in claim 1, characterized in that the bearing (16 and 17), which support the rotational shaft (15) of the rotor(14), are linked mechanically to the second part (10) of the stator magnetic circuit by fixing pieces (41 and 42) made of a non-magnetic and insulating material.

9. The motor as claimed in claim 3, characterized in that, with the shaft (15) of the rotor (14) of the said motor being linked mechanically to the shaft (27) of the rotor (32) of a pump, the second part (10) of the stator magnetic circuit, the rotor (14) of the said motor, the support bearings (16 and 17) and the rotor (32) of the pump are enclosed in a rotor chamber (30) with a leaktight wall equipped with an inlet (34) and with an outlet (35) for a fluid to be pumped.

10. The motor as claimed in claim 3, characterized in that the stator electrical windings (7,8) include at least one connection (38) for drawing electrical energy.

11. The motor as claimed in claim 3, characterized in that the stator magnetic circuit includes a supplementary electrical winding for drawing electrical energy.

12. The motor as claimed in claim 3, characterized in that it further includes an inlet tapping (23) and an outlet tapping (24) which are mounted on the wall of the stator chamber (20) for connecting an external device for cooling a fluid filling the stator chamber (20).

13. The motor as claimed in claim 3, characterized in that it further includes a jacket (43) produced from a non-magnetic insulating material which encases the first part (2) of the stator magnetic circuit, connected in leaktight fashion to the part (22) produced from non-magnetic material of the wall of the chamber (20) in order to render the said chamber leaktight.

14. The motor as claimed in claim 3, characterized in that the bearing (16 and 17), which support the rotational shaft (15) of the rotor (14), are linked mechanically to the second part (10) of the stator magnetic circuit by fixing pieces (41 and 42) made of a non-magnetic and insulating material.

* * * * *